United States Patent [19]

Ichino et al.

[11] Patent Number: 4,592,885
[45] Date of Patent: Jun. 3, 1986

[54] FILM MANUFACTURING METHOD FOR IMPROVED SURFACE SMOOTHNESS

[75] Inventors: Shuichi Ichino; Zenichi Higuchi; Motoharu Kuroki, all of Kanagawa, Japan

[73] Assignee: Fuji Photo Film Co., Ltd., Kanagawa, Japan

[21] Appl. No.: 533,890

[22] Filed: Sep. 20, 1983

Related U.S. Application Data

[63] Continuation-in-part of Ser. No. 263,803, May 14, 1981, abandoned.

[30] Foreign Application Priority Data

May 20, 1980 [JP] Japan ................................ 55-66876

[51] Int. Cl.$^4$ ............................................. B29C 47/04
[52] U.S. Cl. ..................... 264/171; 264/187; 264/200; 264/207; 264/217; 425/131.1; 425/224
[58] Field of Search ............... 264/187, 200, 207, 171, 264/173, 212, 208, 217–218; 425/131.1, 133.1, 66, 224

[56] References Cited

U.S. PATENT DOCUMENTS

| | | | |
|---|---|---|---|
| 1,924,010 | 8/1933 | Wickham | 425/224 |
| 2,052,695 | 9/1936 | Chiverton | 425/224 |
| 2,295,280 | 9/1942 | Fordyce | 425/224 |
| 2,364,552 | 12/1944 | Reichel | 264/176 R |
| 2,579,815 | 12/1951 | Gialanella | 264/176 R |
| 2,607,704 | 8/1952 | Fordyce et al. | 106/177 |
| 2,739,070 | 3/1956 | Fordyce et al. | 106/189 |
| 2,761,417 | 9/1956 | Russell et al. | 425/133.5 |
| 2,831,211 | 4/1958 | Bushnell | 425/130 |
| 2,927,542 | 3/1960 | Moser | 425/462 |
| 2,932,855 | 4/1960 | Bartlett et al. | 264/171 |
| 3,082,481 | 3/1963 | Hinde et al. | 264/200 |
| 3,318,987 | 5/1967 | Fitzgerald | 264/171 |
| 3,389,194 | 6/1968 | Somerville | 425/130 |
| 3,980,744 | 9/1976 | Cogswell | 264/173 |
| 4,187,269 | 2/1980 | Hutchinson et al. | 264/171 |
| 4,197,069 | 4/1980 | Cloeren | 425/133.5 |
| 4,485,062 | 11/1984 | Dawes et al. | 264/171 |

FOREIGN PATENT DOCUMENTS

| | | | |
|---|---|---|---|
| 640252 | 11/1963 | Belgium | 264/208 |
| 2271917 | 1/1976 | France | 425/97 |
| 42-6266 | 3/1967 | Japan | 264/171 |
| 51-10863 | 1/1976 | Japan | 425/133.5 |
| 53-134869 | 11/1978 | Japan . | |

*Primary Examiner*—Jeffery Thurlow
*Attorney, Agent, or Firm*—Sughrue, Mion, Zinn, Macpeak & Seas

[57] ABSTRACT

A method for manufacturing film without melt fracturing in which a flow of a polymer solution having a high viscosity extruded from a die slit onto a running and spreading plane is extruded through the die slit together with a low viscosity solution with the polymer solution is covered by the low viscosity solution. In a first preferred embodiment, the low viscosity solution is passed through a confluence tube so as to surround the high viscosity solution in the form of a coaxial cylinder after which the two solutions are passed through a slit die which maintains the covering relationship between the high and low viscosity solutions. In another preferred embodiment, a slit die is provided which has a central passage into which the high viscosity fluid is supplied and side passages of a slit-like shape similar to that of the main passage into which the low viscosity solution is supplied.

1 Claim, 8 Drawing Figures

FILM MANUFACTURING METHOD FOR IMPROVED SURFACE SMOOTHNESS

BACKGROUND OF THE INVENTION

This application is a continuation-in-part of application Ser. No. 263,803, filed May 14, 1981 now abandoned.

The present invention relates to a method for manufacturing film with an exceptionally high concentration of solid matter compared with that of conventional film making methods. More particularly, the invention concerns a film manufacturing method wherein a melt fracture phenomenon, which includes anomalous streaming of a low degree such as mat sharkskin of the like, is prevented from occurring when a polymer solution having a high viscosity is extruded with a large velocity such as to impose a high shear stress on the polymer solution at the time of its running and spreading in the film making process. The invention results in an increase in the manufacturing efficiency in a degree greater than that expected from the decrease achieved in the drying load of the film manufacturing apparatus alone.

In general, films of cellulose acetate, carbonate, cellophane and other macromolecular substances are made by the so-called film-making solution method which includes the step of extruding a polymer solution from a die slit to force it to run and spread over a smooth plane having a band of a drum form on which the polymer solution can run and spread. The smooth plane is hereinafter termed a "running and spreading plane". The spread solution is dried and solidified to produce the film. The product is then wound of a reel as it is peeled off the plane.

In the art of film manufacture, it is desired that each step in the manufacturing method be performed more quickly in order to raise manufacturing efficiency. For this purpose, several procedures have been earlier proposed.

By way of example, one such procedure for use with a cellulose triacetate film is described below. According to this procedure, the time required for the gelation of a cellulose triacetate solution which is forced to run and spread over a running and spreading plane is reduced. The reduction is achieved by adding a solvent having a low solubility to cellulose triacetate, such as acetone, cyclohexane, butanol or the like, to methylene chloride, which is a primary solvent for cellulose triacetate as disclosed in, for example, U.S. Pat. Nos. 2,607,704 and 2,739,070.

Another procedure concerns the reduction of the drying time required for peeling the film off the running and spreading plane. This may be achieved, as disclosed for example in Published Japanese Patent Application No. 13469/78, by dividing the running and spreading step into two operations. That is to say, a portion of the film is first run and spread over a plane, after which the remaining portions are run and spread over the same plane. However, this procedure involves a serious defect in that the surface quality of the manufactured film is markedly low. This is because a material having a sufficiently high strength is required as the film base (for instance, in the case of highly polymerized cellulose triacetate, the solution is required to have a sufficiently high concentration such that its viscosity is in the range of 3,000 to 100,000 poise (measured using a cone and plate-type rotary viscometer) with a shearing rate less than 1/sec). A solution having such a high viscosity causes what is known as "melt fracture" when it is extruded from a die slit at a high speed due to the high shear stress on the polymer solution.

As for causes of the occurrence of "melt fracturing", various explanations have been proposed as can be found in many published investigations on extrusion molding in the art of polymer melts. It can be generally stated, however, that when a material having a high viscosity is extruded with a velocity beyond the limit shearing velocity, irregular elastic strain is caused in the molten material at the time of passage thereof through the die slit. Such irregular elastic strain is responsible for the melt fracturing. Various counter-measures against this phenomenon have been proposed in the art of film manufacturing, although no satisfactory measure has yet been found up to this time.

SUMMARY OF THE INVENTION

Therefore, an object of the present invention is to eliminate the above-described drawbacks in the conventional film making method, and to provide a film making method which does not result in the above-described melt fracture phenomenon, even if a polymer solution having a high viscosity is extruded, without losing the effect of the use of a highly concentrated solution on the manufacturing efficiency.

The above-described object is attained by extruding a flow of a polymer solution having a high viscosity through a die slit onto a running and spreading plane together with a solution having a low viscosity, in such a manner that a small amount of the solution having a low viscosity covers the solution having a high viscosity.

Referring to FIG. 1, which shows the results measured by the applicants regarding the relationship between the time required for peeling the film off the plane on which the solution of cellulose triacetate runs and spreads, and the concentration of the solution, as the concentration of the solution increases from 20% to 30%, the drying load per hour decreases by 1/1.5. Moreover, as shown in FIG. 1, the drying-to-peeling time required decreases from 240 sec to 60 sec, that is, decreases by ¾. This means that the manufacturing speed may be increased by 4 times in the same drying apparatus. However, with respect particularly to solutions having a concentration of more than 23%, melt fracturing occurred when the same were extruded from a die slit at a high speed, as a result of which the surface quality of the manufactured film was low. After studying the melt fracture and conducting film drying experiments, it has been found that the extrusion of a small amount of a low viscosity solution through a die slit onto a running and spreading plane together with the high viscosity solution is effective to reduce the shearing stress inside the die slit to a value below the limit shearing stress, thereby preventing melt fracturing, and also to maintain the peeling ability of the highly concentrated solution even when it is dried.

DETAILED DESCRIPTION OF THE PREFERRED EMBODIMENTS

The present invention will be better understood from the following description taken in conjunction with the accompanying drawings.

Figure 1:
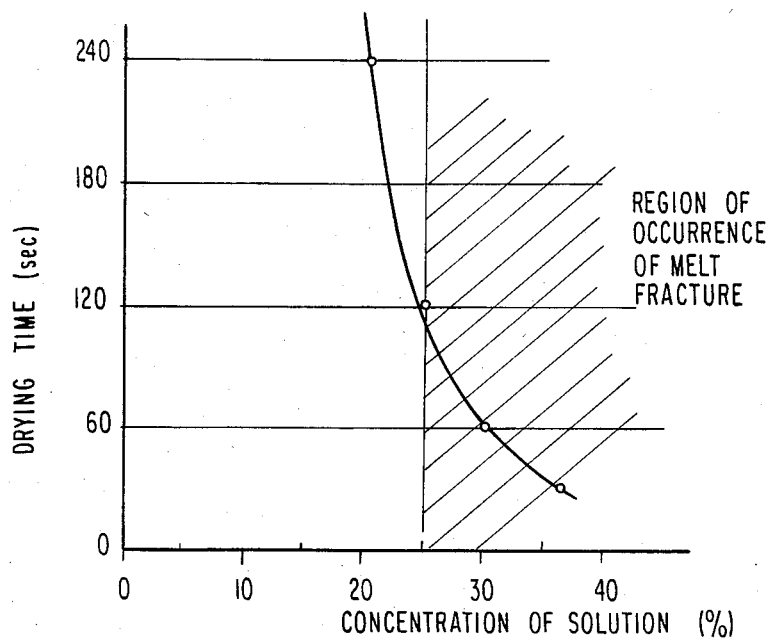
FIG. 1 is a graph showing drying time as a function of solution concentration.
Figure 2:
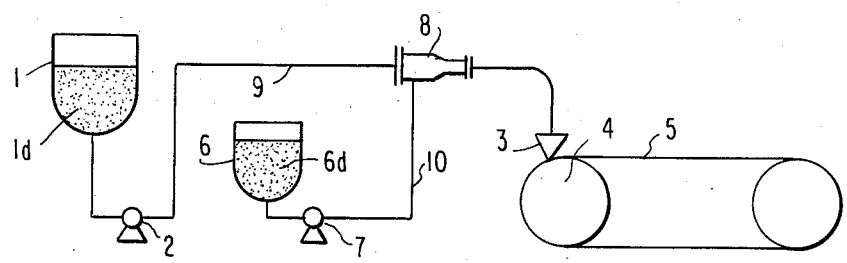
FIG. 2 is a schematic diagram of an apparatus which operates in accordance with a preferred embodiment of a film manufacturing method of the present invention.

Referring now to FIG. 2, which is a schematic diagram of an apparatus for manufacturing cellulose triacetate rolled film in accordance with a preferred embodiment of the present invention, a high viscosity solution of cellulose triacetate is filled in the solution preparing tank 1. Reference numeral 1d indicates the high viscosity solution which is transferred out of the tank 1 by by a pump 2. In addition, in FIG. 1, reference numeral 3 indicates a slit die, 4 indicates a drum, 5 indicates an endless band for running and spreading a cellulose triacetate solution thereover, 6 indicates a tank for preparing a low viscosity solution of cellulose triacetate, which solution is indicated by 6d, 7 indicates a pump for transferring the solution 6d out of the tank 6, 8 indicates a confluence tube used for joining the high viscosity solution 1d with the low viscosity solution 6d, 9 indicates a pipe for conveying the high viscosity solution 1d, and 10 indicates a pipe for conveying the low viscosity solution 6d.

Herein, the high viscosity solution 1d is a solution having a viscosity of 3,000 to 100,000 poise, and the low viscosity solution 6d is a solution having a viscosity of 1 to 3,000 poise. In practive it is preferred to adjust the ratio of the viscosity of the high viscosity solution to that of the low viscosity solution to five or more.

Figure 3:
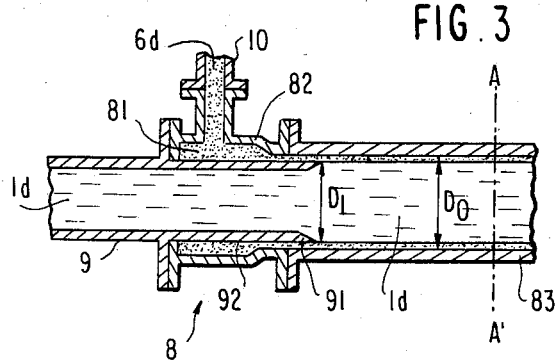
FIG. 3 is an enlarged sectional view of a confluence tube used in the apparatus of FIG. 2.

The confluence tube 8 is constructed, as shown in FIG. 3, such that one end of the high viscosity solution conveying pipe 9 is fitted to one end of a pipe 83 the other end of which leads to the slit die 3. The fitting parts are joined with a joint 82.

The chamber 81 in which the low viscosity solution 6d is temporarily stored is formed in a position outside and around the solution conveying pipe 9. The low viscosity solution 6d flows out of the chamber 81, through a constriction 92, and then joins the high viscosity solution 1d. The end part 91 of the solution conveying pipe 9 which is inserted into the pipe 83 has the shape of a knife edge so that the solutions will flow together smoothly. To accomplish this, the inside diameter $D_0$ of the pipe 83 and the outside diameter $D_1$ of the solution conveying pipe should have the relationship:

$$0.99 > D_1^2/D_0^2 > 0.9.$$

The remainder of the components used in the film manufacturing apparatus of the present invention, such as the slit die 3, the drum 4, the running and spreading band 5 and so on, are well-known in the art. Therefore, detailed descriptions of these components are omitted here.

Film is manufactured by the apparatus so constructed in the following manner. The high viscosity solution 1d, which is adjusted to a prescribed concentration and to a prescribed viscosity and is contained in the solution preparing tank 1, is conveyed to the confluence tube 8 by the pump 2. On the other hand, the low viscosity solution 6d contained in the tank 6 is also conveyed to the confluence tube 8. Therein, the amount of the low viscosity solution 6d is controlled to 10 percent or less of the total amount of the two solutions supplied. Inside the confluence tube 8, the low viscosity solution 6d leaves the chamber 81, passes through the constriction 92 and joins the flow of the high viscosity solution within the low viscosity solution. At the time of confluence of the two solutions, they flow laminarly and do not mix as they run together. The solutions reach the slit die with this state maintained.

Figure 4:
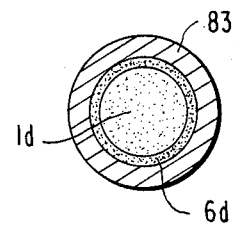
FIG. 4 is a vertical sectional view taken along line A—A' in FIG. 3.

FIG. 4 is a sectional view illustrating this arrangement. FIG. 4 corresponds to the vertical sectional view taken along line A—A' in FIG. 3

Figure 5:
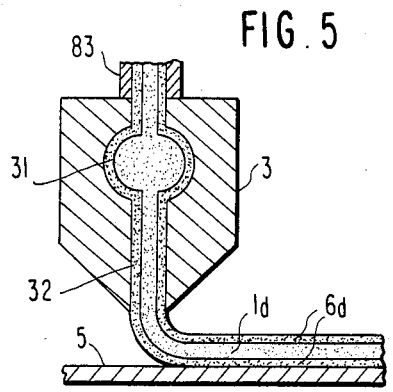
FIG. 5 is an enlarged sectional view of a slit die used in the apparatus of FIG. 1.

FIG. 5 is a sectional view illustrating the extrusion of the above-described solutions onto the running and spreading band 5. As shown in this figure, both solutions described above are extruded from the solution storing chamber 31 onto the running and spreading band 5 through the slit 32. The solutions spread onto the band 5 are subjected to a drying treatment so that the triple-layer construction formed from the layers of the low viscosity solution 6d, the high viscosity solution 1d and the low viscosity solution 6d is fixed.

The proportion of the low viscosity solution 6d to the high viscosity solution 1d in the direction of film thickness is preferably 0.1 to 5%, more preferably, 2 to 3%. In the latter case, the supply rate of the low viscosity solution is 4 to 6%.

In brief, it is desirable, in order to reduce the drying load, to supply the low viscosity solution in as small amounts as possible while still preventing the occurrence of melt fracturing.

Figure 6:
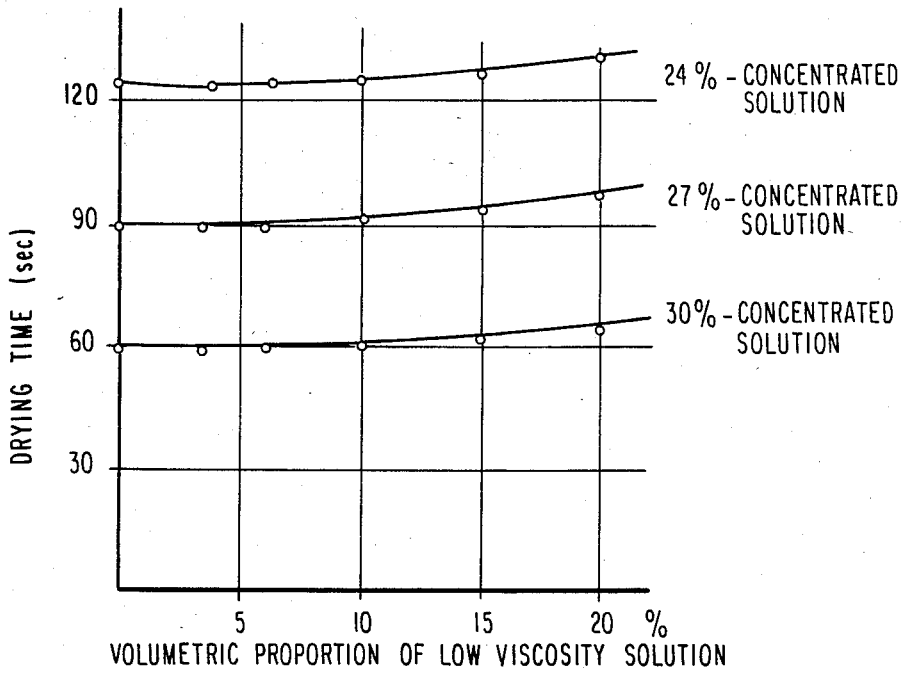
FIG. 6 is a plot of the drying time versus the proportion of low viscosity solution.

FIG. 6 is a graph showing the time required for drying the film for the case of a high viscosity solution passing through the center of a pipe having a concentration of 24 to 34%, covered by a low viscosity solution having a concentration of 20% and supplied in an amount of 3 to 20% of the total flow. The same drying conditions were maintained for all cases. From FIG. 6, it is seen that when the amount of the low viscosity solution is below 10%, the increase in drying time caused by the presence of the low viscosity solution is no more than about 5%. Accordingly, the advantages attained by using a highly concentrated solution are maintained.

Figure 7:
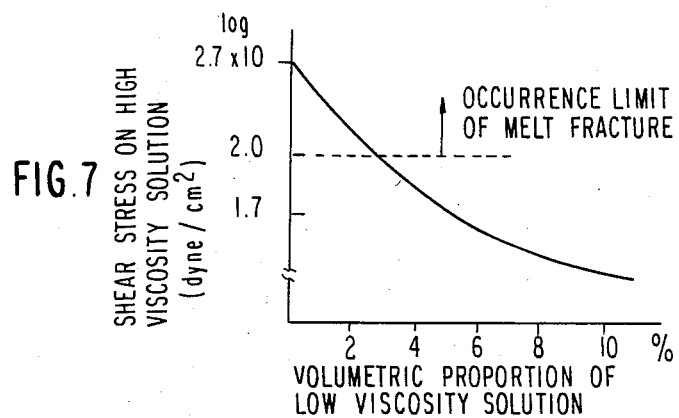
FIG. 7 is a fluidity characteristic curve of polymer solutions which shows the occurrence limit of melt fracturing.

The proper supply amount of the low viscosity solution 6d necessary to prevent melt fracture can be determined utilizing the fluidity characteristic curve shown in FIG. 7. Namely, to determine the proportion of the low viscosity solution 6d, a fluidity characteristic curve is first drawn by plotting the shear stress imposed on the high viscosity solution 1d on the ordinate and the supply rate ratio of the low viscosity solution 6d to the high viscosity solution 1d on the abscissa, as shown in FIG. 7. From this curve, the optimum amount to be supplied such that melt fracture does not occur is selected. FIG. 7 shows an actual relationship between the supply rate (%) of the low viscosity solution (450 poise) to the high viscosity solution for cellulose triacetate (13,000 poise)

and the occurrence limit of melt fracture. In this case, the limit shearing stress is about $2 \times 10^5$ dyne/cm$^2$.

In accordance with a preferred embodiment of a film manufacturing method of the present invention, as described above, a frictional force acting between the inner wall of the pipe 83 and the high viscosity solution 1d and a frictional force acting between the inner wall of the slit die 3 and the high viscosity solution 1d, respectively, are reduced by the substitution of a small amount of the low viscosity solution 6d for the high viscosity solution 1d in the contact region. This substitution is performed by extruding the flow of the high viscosity solution while supplying the low viscosity solution into the flow of the high viscosity solution so that the flow of the high viscosity solution is covered with the low viscosity solution. The shear stress applied to the composite solution is reduced as a result of the reduction of frictional forces. Accordingly, the present invention is advantageous in that the occurrence of melt fracturing, which impedes the extrusion of the high viscosity solution 1d due to the high shear viscosity, is prevented, and hence the film manufacturing process is remarkably speeded up without losing the advantages produced by the use of the highly concentrated solution in the subsequent drying step on the running and spreading plate. It has been confirmed experimentally that the film manufacturing speed attained by the present invention is more than about three times that attained by conventional methods.

The present invention has been described with reference to a preferred embodiment. Of course, the present invention is not limited to such an embodiment and various modifications as described below can be made within the scope of the invention.

Figure 8:
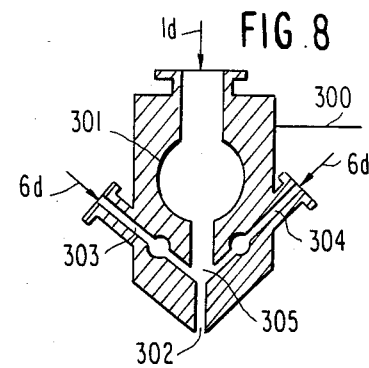
FIG. 8 is a sectional view of another embodiment of the slit die, which constitutes an important part of the present invention.

Although a confluence tube has been described as being employed for joining the low viscosity solution with the flow of the high viscosity solution in the above-described embodiment, the confluence tube may be replaced by a slit die 300 as shown in FIG. 8. This slit die 300 has a structure such that two slits 303 and 304 are arranged so that the high viscosity solution 1d, which is extruded from the solution storing chamber 301 through the slit 302, is sandwiched between the two slits extending in the direction of the width of a gap in the slit 302, namely in the direction of film thickness. Prescribed amounts of the low viscosity solutions 6d are supplied with prescribed velocities from the slit 303 and the slit 304. Thereby the high viscosity solution 1d and the low viscosity solutions 6d are joined at the approach 305 to the slit 302 and extruded simultaneously therefrom. The same advantageous effects as described above are also obtained using the slit die 300.

In accordance with the present invention, it is not necessarily required that the high and low viscosity solutions have the same essential composition provided that any difference in their compositions has no influence on the quality of the film. Accordingly, a wide variety of solutions can be used.

The effects of the present invention will be clarified by the following Example.

EXAMPLE

Films were manufactured under conditions set forth in Table 1 using the film manufacturing apparatus of the present invention shown in FIG. 2. Further, using a conventional film manufacturing apparatus, which corresponds to the present apparatus from which the components from the solution preparing tank 6 to the confluence tube 8 were removed, films were made under the same conditions described above. Specific properties of these films were tested and compared with one another. The results obtained are shown in Table 2.

TABLE 1

|  |  |  | Example 1 | Example 2 | Example 3 |
|---|---|---|---|---|---|
| HIGH VISCOSITY = A |  |  |  |  |  |
| Cellulose Triacetate |  | Polymerization Deg. | 360 | 348 | 352 |
|  |  | Acetylation Deg. | 60.5 | 60.9 | 59.3 |
| Composition (wgt. prop. to 100 parts of TAC) | solid mat. | Cellulose Triacetate (TAC) | 100 | 100 | 100 |
|  |  | Plasticizer (TPP) | 15 | 15 | 15 |
|  | solvent | Methylene Chloride | 240 | 272 | 184 |
|  |  | Methanol | 27 | 30 | 20 |
| Viscosity (at 30°) (poise) |  |  | 13,000 | 6,000 | 70,000 |
| LOW VISCOSITY = B |  |  |  |  |  |
| Cellulose Triacetate |  | Polymerization Deg. | 354 | 348 | 351 |
|  |  | Acetylation Deg. | 60.4 | 61.0 | 59.5 |
| Composition (wgt. prop. to 100 parts of TAC) | solid mat. | Cellulose Triacetate (TAC) | 100 | 100 | 100 |
|  |  | Plasticizer (TPP) | 15 | 15 | 15 |
|  | solvent | Methylene Chloride | 414 | 367 | 471 |
|  |  | Methanol | 46 | 42 | 52 |
| Viscosity (at 30°) (poise) |  |  | 650 | 1,000 | 400 |
| Weight proportion of the low viscosity solution to the entire solution (B/A + B) |  |  | 6.0 | 3.0 | 8.5 |

TABLE 2

| Relationship between shearing speed $\dot{\gamma}$ and surface quality | | | |
|---|---|---|---|
|  | Example 1 | Example 2 | Example 3 |
| Present Invention | Surface Quality is Good with $\dot{\gamma} = 1000$ [1/S] | Surface Quality is Good with $\dot{\gamma} = 2000$ [1/S] | Surface Quality is Good with $\dot{\gamma} = 200$ [1/S] |
| Conventional Method | Surface is Matted with $\dot{\gamma} = 50$ [1/S] | Surface is Matted with $\dot{\gamma} = 100$ [1/S] | Surface is Matted with $\dot{\gamma} = 10$ [1/S] |

As can be seen from Table 2, the limit shearing speed employable with the method of the present invention is 20 times that of the conventional method. The use of such a high viscosity solution of cellulose triacetate contributes to a sharp decrease in the drying load of the film making apparatus compared with the use of the conventional low viscosity solution. Due to the decrease in the drying load, the film manufacturing speed can be increased by a factor of three or more with respect to a conventional apparatus.

What is claimed is:

1. A method for manufacturing film comprising the steps of:

extruding a high viscosity polymer solution through a die slit onto a plane adapted for running and spreading of said polymer solution thereon;

simultaneously extruding through said die slit a low viscosity solution wherein said low viscosity solution covers said high viscosity solution; and wherein, for improving the surface smooothness and production efficiency of the resultant film:
(a) the viscosity of said high viscosity polymer solution is in a range of 3,000 poise to 100,000 poise,
(b) the viscosity of said low viscosity solution is in a range of 1 poise to 3,000 poise,
(c) the viscosity ratio of said high viscosity polymer solution to said low viscosity solution is equal to 5 or more, and
(d) the amount of said low viscosity solution is no more than 10% of the total amount of said extruded solution.

* * * * *